United States Patent
Kaneshige et al.

(10) Patent No.: US 10,573,175 B2
(45) Date of Patent: Feb. 25, 2020

(54) SYSTEMS AND METHODS FOR TRAFFIC SIGN VALIDATION

(71) Applicant: TOYOTA MOTOR EUROPE, Brussels (BE)

(72) Inventors: Yuzo Kaneshige, Auderghem (BE); Tomoya Kawasaki, Brussels (BE); Christophe Gillet, Brussels (BE); Tom Rycken, Brussels (BE); Tomoya Sano, Brussels (BE)

(73) Assignee: TOYOTA MOTOR EUROPE, Brussels (BE)

(*) Notice: Subject to any disclaimer, the term of this patent is extended or adjusted under 35 U.S.C. 154(b) by 173 days.

(21) Appl. No.: 15/519,317

(22) PCT Filed: Oct. 14, 2014

(86) PCT No.: PCT/EP2014/072059
§ 371 (c)(1),
(2) Date: Apr. 14, 2017

(87) PCT Pub. No.: WO2016/058635
PCT Pub. Date: Apr. 21, 2016

(65) Prior Publication Data
US 2017/0243483 A1    Aug. 24, 2017

(51) Int. Cl.
G08G 1/0962   (2006.01)
B60R 1/12     (2006.01)
G06K 9/00     (2006.01)

(52) U.S. Cl.
CPC ........... G08G 1/09623 (2013.01); B60R 1/12 (2013.01); *B60R 2001/1253* (2013.01);
(Continued)

(58) Field of Classification Search
None
See application file for complete search history.

(56) References Cited

U.S. PATENT DOCUMENTS 5,999,877 A * 12/1999 Takahashi .......... G06K 9/00785
340/905
2004/0201673 A1* 10/2004 Asai ........................ B60R 1/00
348/148
(Continued)

FOREIGN PATENT DOCUMENTS

DE    29610677 U1    9/1996
DE    19829162 A1    1/2000
(Continued)

OTHER PUBLICATIONS

Apr. 18, 2017 International Preliminary Report on Patentability issued in International Patent Application No. PCT/EP2014/072059.
(Continued)

*Primary Examiner* — Van T Trieu
(74) *Attorney, Agent, or Firm* — Oliff PLC

(57) ABSTRACT

A driver assistance system for a vehicle includes image obtaining unit configured to obtain data in proximity to the vehicle, determine a regulation value based on the data, and at least one sensor unit configured to provide state information related to a state of the vehicle. Processing unit also includes being configured to determine whether a zone condition applies based on the data, confirm a validity of the detected regulation value based on the state information, the determined regulation value, the zone condition, and an age of the data, the processing unit is configured to revoke the validity, and wherein, upon determination of a zone condition, the processing unit is configured to increase the predetermined threshold duration. The processing unit is also configured to cause the regulation value to be displayed when the validity is confirmed and to prevent display of the regulation value when the validity is revoked.

12 Claims, 3 Drawing Sheets

(52) U.S. Cl.
CPC ... *B60R 2300/105* (2013.01); *B60R 2300/205* (2013.01); *G06K 9/00818* (2013.01)

(56) References Cited

U.S. PATENT DOCUMENTS

| | | | |
|---|---|---|---|
| 2006/0290482 A1* | 12/2006 | Matsumoto | B60Q 1/2665 340/436 |
| 2008/0137908 A1* | 6/2008 | Stein | G06K 9/00818 382/103 |
| 2009/0093927 A1* | 4/2009 | Mueller-Schneiders | B60R 16/0232 701/36 |
| 2010/0217494 A1 | 8/2010 | Heft et al. | |
| 2011/0261197 A1* | 10/2011 | Wagner | G08G 1/096716 348/148 |
| 2012/0046855 A1 | 2/2012 | Wey et al. | |
| 2013/0034261 A1* | 2/2013 | Perlin | G06K 9/00818 382/100 |
| 2013/0049988 A1 | 2/2013 | Roeber et al. | |
| 2013/0110315 A1* | 5/2013 | Ogawa | G08G 1/096716 701/1 |
| 2014/0118169 A1* | 5/2014 | Hamberger | G08G 1/052 340/936 |
| 2014/0119605 A1* | 5/2014 | Zobel | G06K 9/00818 382/103 |
| 2014/0327772 A1* | 11/2014 | Sahba | G06K 9/00818 348/148 |

FOREIGN PATENT DOCUMENTS

| | | |
|---|---|---|
| DE | 10 2004 042382 A1 | 3/2006 |
| EP | 1131803 B1 | 6/2002 |
| EP | 1826736 B1 | 5/2008 |

OTHER PUBLICATIONS

Jul. 2, 2015 International Search Report issued in International Patent Application No. PCT/EP2014/072059.

\* cited by examiner

SYSTEMS AND METHODS FOR TRAFFIC SIGN VALIDATION

FIELD OF THE DISCLOSURE

The present disclosure is related to systems and methods for road sign recognition, and more particularly, to reducing adverse effects associated with erroneous road sign identification.

BACKGROUND OF THE DISCLOSURE

Various systems exist for providing assistance to drivers of motor vehicles. For example, one such area of assistance relates to automated road sign recognition.

Road sign recognition may be accomplished by using suitable devices (e.g., optical devices such as a camera) for perceiving or detecting the surroundings of a motor vehicle. Systems are available commercially, for example, both from automobile manufacturers, and from manufacturers of portable navigation devices (PNDs). The PND systems are based on GPS signals and map data for supplying the driver with information relating to road signs.

Some existing systems implement a camera device for improving recognition accuracy and robustness. The manufacturers of vehicles use front-mounted camera devices and means for combining signals with data relating to the driving state of the vehicle. A further option is means for combining signals with navigation devices.

In such systems certain issues exist such as, for example, how long to maintain display of a particular regulation value to the driver (i.e., how long is such a value relevant), what to do when multiple indicators are recognized in succession, and how should a vehicle change in direction or crossing of an intersection affect display of the regulation value.

US 2012/046855 discloses systems methods for recognizing road signs. An image of a road sign is captured by least one image sensor. A vehicle computer receives the image data representing one or more road signs along a route and displays one or more images of the road sign based on the image data. The display is capable of presenting one or more status of the road sign based on one or more travel states for the vehicle such as an amount of elapsed travel time, distance travelled, or speed.

EP 1 826 736 B1 discloses a vehicle having a controller for determining a road sign and/or regulation content of the road sign, where the road sign is covered in a camera picture. A display is provided for displaying a representation of the road sign or an information about the regulation content. The display is changeable between two output formats, which have smaller and higher probabilities of road sign determination, respectively. A monochrome or grey value representation takes place in one output format, and a colored representation takes place in another output format.

EP 1 131 803 B1 discloses a device and a method enabling traffic signs to be recognized and displayed to an observer in the form of a memory aid. The reject rate with respect to the recognition of objects that are recognized as traffic signs remains low. Image data from an image sensor is analyzed and classified in an information processing unit. Image sections and/or image data corresponding to a symbolic representation stored in a memory unit is/are archived in a memory unit and represented by means of a display unit on the basis of classification results. When the image data is further processed, the extracted objects are separated into specific classes and sub-classes of traffic-signs and classified. A synthetic image of a traffic sign is generated, stored in a memory unit and displayed by means of a display unit.

DE 296 10 677 U1 discloses a system for displaying road signs, the system having, in addition to a display for displaying messages to the driver, a signal transmitter which activates the display as a function of the distance traveled, and makes the display visible or invisible.

DE 198 29 162 A1 discloses the use of an electronic camera and of an image recognition device cooperating therewith, for the purpose of recognizing road signs, wherein the image recognition device can be reset to its starting state if, the vehicle turns off the road, for example after a road sign indicating a speed limit.

SUMMARY OF THE DISCLOSURE

Configurations described above generally lack desirable control for confirming the validity of a detected sign, particularly when a zone condition exists. As used herein a zone condition shall refer to an area within which a particular set of traffic rules applies throughout the area. In other words, and as an example, a speed limit indicated at the entry of a zone area applies to all roads throughout the zone area demarcated by the location of a zone indicator and an end-of-zone indicator.

According to embodiments of the present disclosure, a driver assistance system for a vehicle is provided. The system includes image obtaining means configured to obtain data regarding one or more regulation indicators in proximity to the vehicle, determine a regulation value based on the data, at least one sensor means configured to provide state information related to a state of the vehicle, and processing means. The processing means is configured to determine whether a zone condition applies based on the data, confirm a validity of the detected regulation value, cause the regulation value to be displayed when the validity is confirmed, and prevent display of the regulation value when the validity is revoked. Upon determination of a zone condition, the processing means is configured to increase a threshold duration, and when the state information indicates that the vehicle has exceeded the regulation value, and a duration of the exceeding is greater than the threshold duration, the processing means is configured to revoke the validity.

By providing such a system according to embodiments of the present invention, a driver can be informed of current regulation values (e.g. speed limits) and reassured that the validity of the regulation value displayed on a display in the vehicle is current. This can be particularly important in a zone situation because the ramifications in such a zone be of greater consequence. This is true for at least the reason that, upon entry into a zone a driver may be informed of, for example, a speed limit value that applies throughout the zone. No further indication of said speed limit may appear during driving in the zone, and a driver may be unsure as to what speed limit applies while driving within such a zone. For example the driver may be unaware that the zone speed limit still applies and may therefore accelerate to above the legal speed limit. This can be particularly problematic because penalties in such a zone situations may be significantly higher than in a non-zone situation. Therefore, it is important that the driver be aware at all times within the zone of current regulation values, until the vehicle exits the zone.

The state information may include at least one of a vehicle speed, a distance travelled, and a change in vehicle travel direction.

The processing means may be configured to modify the display of the regulation value to reflect an age of the data. For example, as the time from the last regulation indicator identification by the image obtaining means increases, the display may change accordingly.

The display modification may be selected from at least one of graying of the display and increasing a transparency of the displayed regulation value.

According to embodiments of the present disclosure, when the state information indicates a change of direction of the vehicle, the processor is configured to revoke the validity of the regulation indicator unless a zone condition has been determined. Conversely, when it is determined that a vehicle has entered a zone area, a change in direction of the vehicle may not result in revocation of the validity of a regulation indicator.

The regulation value may include a speed limit.

According to another embodiment of the present disclosure, a method for driver assistance is provided. The method includes obtaining data regarding one or more regulation indicators in proximity to a vehicle, determining a regulation value based on the data, receiving state information related to the vehicle, increasing a threshold duration upon determination of a zone condition, confirming a validity of the detected regulation value based on the state information, the determined regulation value, the zone condition, and displaying the regulation value when a validity of the regulation value is confirmed, and hiding the regulation value when the validity of the regulation value is revoked, wherein when the state information indicates that the vehicle has exceeded the regulation value, and a duration of the exceeding is greater than the threshold duration, the validity is revoked.

By providing such a method, embodiments of the present disclosure enable the driver to be informed of current regulation values (e.g. speed limits) and be assured that the validity of a regulation indicator is current. As noted above this can be particularly important in its own situation.

The method may include modifying the display of the regulation value based on an age of the data, wherein the modifying is selected from at least one of a graying and an increasing a transparency of the displayed regulation value.

The method may also include revoking the validity when the state information indicates a change in vehicle direction, unless a zone condition has been determined. Conversely, when a zone condition is in effect, a change in vehicle direction indicated by the state information may not cause revocation of the validity of the regulation indicator.

The regulation value may include a speed limit.

According to yet another embodiment of the present disclosure, a driver assistance system for a vehicle is provided. The system includes a camera configured to obtain optical data regarding one or more regulation indicators and to determine a regulation value based on the data, at least one sensor configured to provide state information related to a state of the vehicle; and a processor. The processor is configured to determine whether a zone condition applies based on the data, confirm a validity of the detected regulation value, and cause the regulation value to be displayed when the validity is confirmed and prevent display of the regulation value when the validity is revoked. Upon determination of a zone condition, the processor is configured to increase a threshold duration, and when the state information indicates that the vehicle has exceeded the regulation value, and a duration of the exceeding is greater than the threshold duration, the processor is configured to revoke the validity of the regulation value.

The state information may include at least one of a vehicle speed, a distance travelled, and a change in vehicle travel direction.

The processor may be configured to modify the display of the regulation value to reflect the age of the data, and the modification may be selected from at least one of graying and increasing a transparency of the displayed regulation value.

Upon determination of a zone condition, the processor may be configured to discount a change in vehicle direction from the state information.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
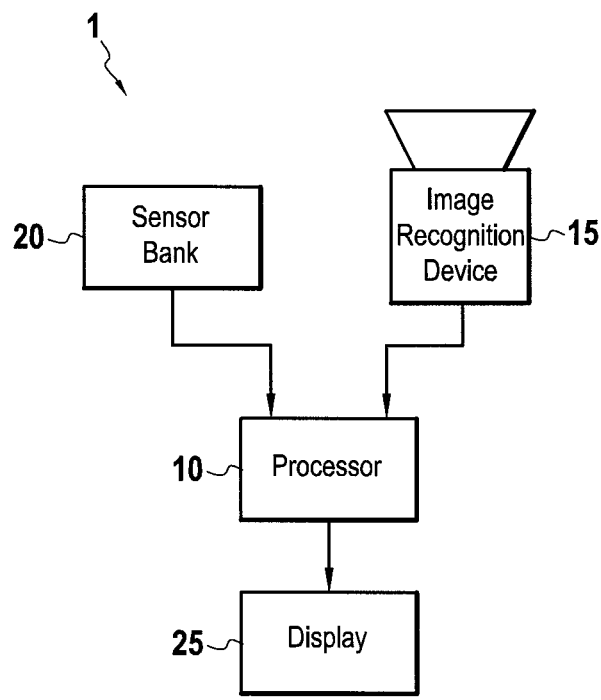
FIG. 1 shows an exemplary driver assistance system according to embodiments of the present disclosure.

FIG. 1 shows an exemplary driver assistance system 1 according to embodiments of the present disclosure. The driver assistance system 1 may include a ECU 10, image obtaining means 15, one or more sensors 20, and a display 25, among others. According to some embodiments, a global positioning system may be optionally provided, as desired, for example to provide additional data regarding location and maps to ECU 10.

Image obtaining means 15 may include, for example, one or more cameras and/or other suitable devices configured to obtain optical data from an area surrounding a vehicle (e.g., in front of a forward moving vehicle). Image obtaining means 15 may be configured to process the data obtained from the surroundings of the vehicle to determine the existence of regulation indicators 50 (e.g., road signs such as a speed limit sign, a zone indicator sign, among others). Such image obtaining means 15 are known in the art, and one of skill in the art will understand that any such image obtaining means 15 may be implemented in the present system without departing from the scope of the present disclosure.

Image obtaining means 15 may be located on a vehicle 2 so as to provide an adequate field of view 4 of the surroundings of the vehicle 2 (e.g. a front and side view spanning approximately 180 degrees). For example, image obtaining means 15 may be located behind the windshield, on a front bumper, a side view mirror, rearview mirror, or other suitable mounting location on the vehicle 2 so as to provide a field of view 4 of approaching regulation indicators 50. According to some embodiments it may be desirable to minimize visibility of image obtaining means 15 for aesthetic reasons, and one of skill in the art will understand that finding a mounting location suitable to achieve this goal while also providing adequate field of view surrounding the vehicle 2 to be a reasonable consideration. The term "adequate" when referring to field of view as used herein shall mean a field of view providing image obtaining means 15 with the ability to identify regulation indicators 50 present on the road surrounding the moving vehicle and to display information related to said regulation indicators to a driver of the vehicle on display 25 with a success rate for identification of at least 99.9 percent.

Image obtaining means 15 may be configured to provide the data regarding regulation indicators 50 surrounding the vehicle 2 to ECU 10. Such data may include, for example a regulation value (e.g. a speed limit and/or a zone indicator). Image obtaining means 15 may provide such data to ECU 10 via a wired connection, a wireless connection, or other suitable method for transferring data to ECU 10. For example, image obtaining means 15 may include wireless communication means (e.g. IEEE 802.11 compliant Wi-Fi hardware) for transmitting data to ECU 10 and/or other devices that may use the data from image obtaining means 15. Alternatively or in addition, for example for safety purposes, a wired connection may be provided. Such a wired connection may be provided, for example, to provide failsafe in a case where a wireless connection should cease to function.

When obtaining data related to a regulation indicator, image obtaining means 15 may be configured to assign a time indicator (e.g., a timestamp) to the data. Alternatively, ECU 10 may be configured to assign a time indicator and/or location indicator to the data upon receipt from image obtaining means 15. By assigning a time indicator to data obtaining by image obtaining means 15, an age of the data (i.e., time elapsed since a regulation indicator was identified by image obtaining means 15) may be tracked by ECU 10, among others.

One or more sensors 20 may be configured to transmit state information related to a state of the vehicle to ECU 10. For example, a state of the vehicle may include a speed at which the vehicle is traveling, a direction in which the vehicle is traveling, a change of direction which the vehicle is undergoing and/or has undergone, a distance which the vehicle has traveled, etc.

Therefore, one or more sensors 20 may include, for example, a steering wheel position sensor, a vehicle speed sensor, a yaw rate sensor, among others. Such sensors, similarly to image obtaining means 15, may be configured to provide such state information wirelessly and/or by wire to ECU 10, and may further include duration information. Duration information associated with the state information may be tracked by ECU 10.

ECU 10 may include any suitable device configured to manipulate data, perform calculations, execute code for decision making, and causing display of information to an operator of vehicle 2, in order to carry out embodiments of the present disclosure. For example ECU 10 may include various analog and/or digital circuits, and may include integrated circuits such as RISC processors, i386 processors, ASIC processors, etc. Typically, on-board computers in modern vehicles include such processors, and one of skill will understand that the present ECU 10 may be comprised by such an on-board computer, or may be separately provided. One of skill in the art will also understand that the exemplary circuits and processors described herein are not intended to be limiting, and that any suitable device may be implemented.

ECU 10 may be linked to one or more databases and/or other memory (e.g., RAM, ROM, etc.) associated with vehicle 2 so as to enable storage of vehicle related data as well as values that may be utilized during processing of vehicle functions (e.g., threshold values), such as regulation indicator validation. One of skill in the art will recognize that information discussed herein with regard to any such databases and/or memory is not intended to be limiting.

ECU 10 may be configured to receive data from image obtaining means 15 and one or more sensors 22 providing functionality associated with the present disclosure. For example ECU 10 may receive data regarding regulation indicators from image obtaining means 15 and one or more sensors simultaneously (e.g., streaming data). Such data may include, for example, a speed limit and/or a zone indicator.

ECU 10 may therefore include one or more means for receiving the data from image obtaining means 15 and the state information from one or more sensors 22. For example ECU 10 may be linked to one or more interlaces, e.g. network interlaces, which may be configured to receive wirelessly and/or by wire the data in the state information, among others.

Based on the data and the state information provided to ECU 10, ECU 10 may be configured to perform various operations for confirming or revoking validity of a regulation value associated with an identified regulation indicator 50, among others. For purposes of explaining embodiments of the present disclosure an example using a speed limit sign 50 and a zone limit sign 55 will be described. One of skill in the art will understand, however, that this is merely exemplary and not intended to be limiting.

Figure 2:
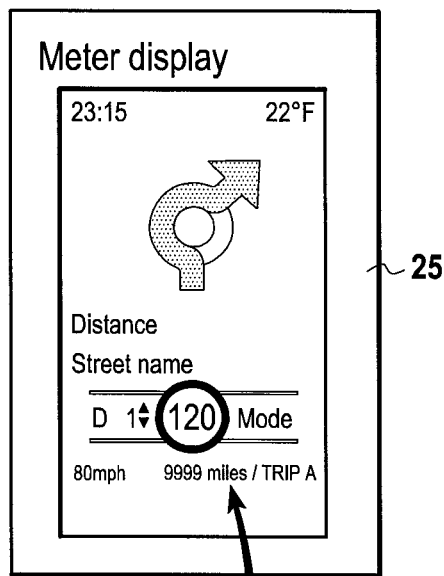
FIG. 2 is a diagram representing an exemplary situation implementing the driver assistance system according to FIG. 1.
Figure 2:
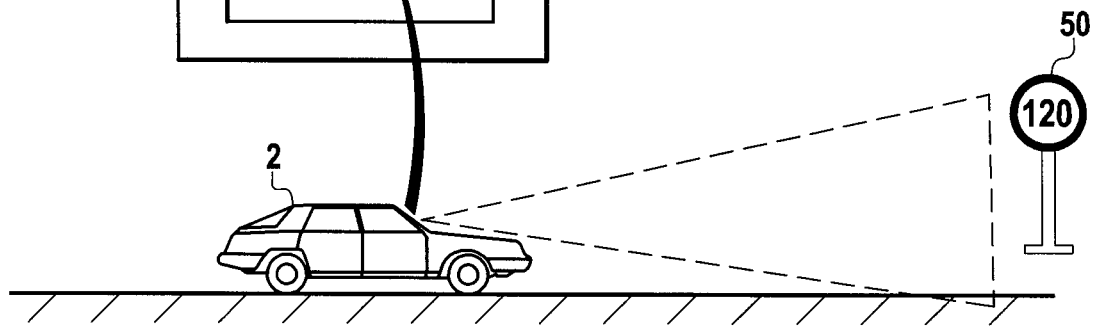

Display 25 may be configured to display information provided by ECU 10 to a driver of vehicle 2. FIG. 2 shows an exemplary display 25 providing information that may be of interest to a driver of vehicle 2. As shown at FIG. 2, a valid speed limit is among the information currently displayed to a driver on display 25.

Display 25 may be any suitable device for providing visible and/or audible information to a driver of vehicle 2. For example, display 25 may include a heads up display (e.g., on a windshield in front of a driver), a monitor, an in-dash display, etc.

Figure 3:
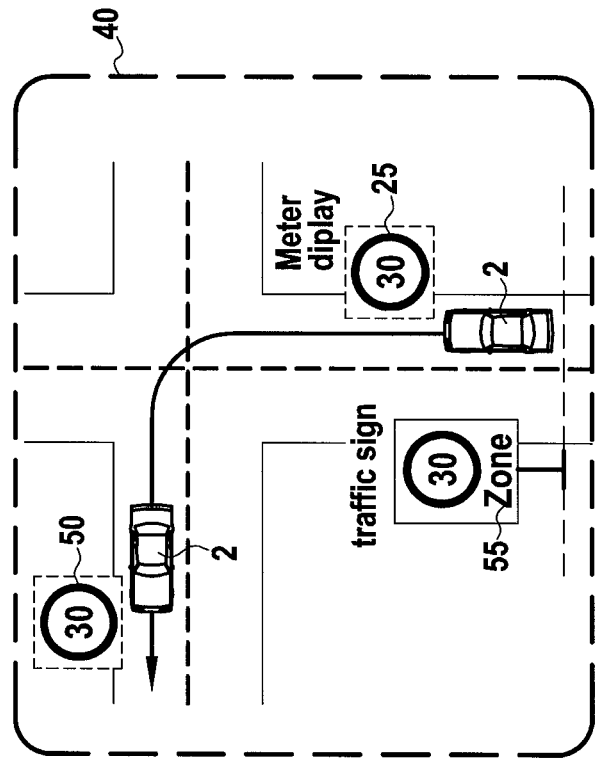
FIG. 3 is a diagram representing another situation implementing the driver assistance system according to FIG. 1.
Figure 3:
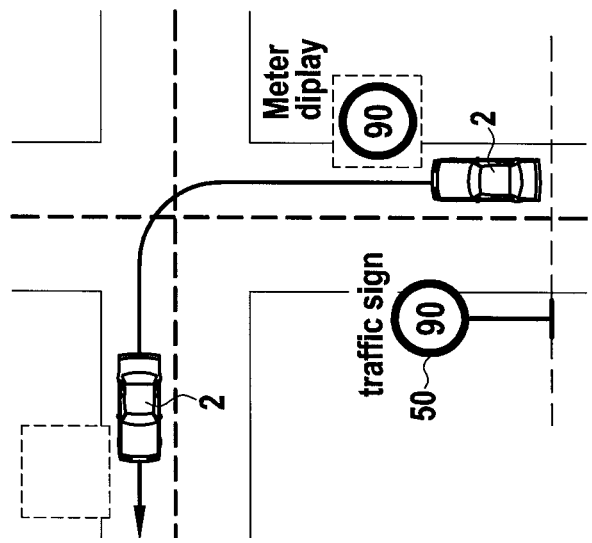
Figure 4:
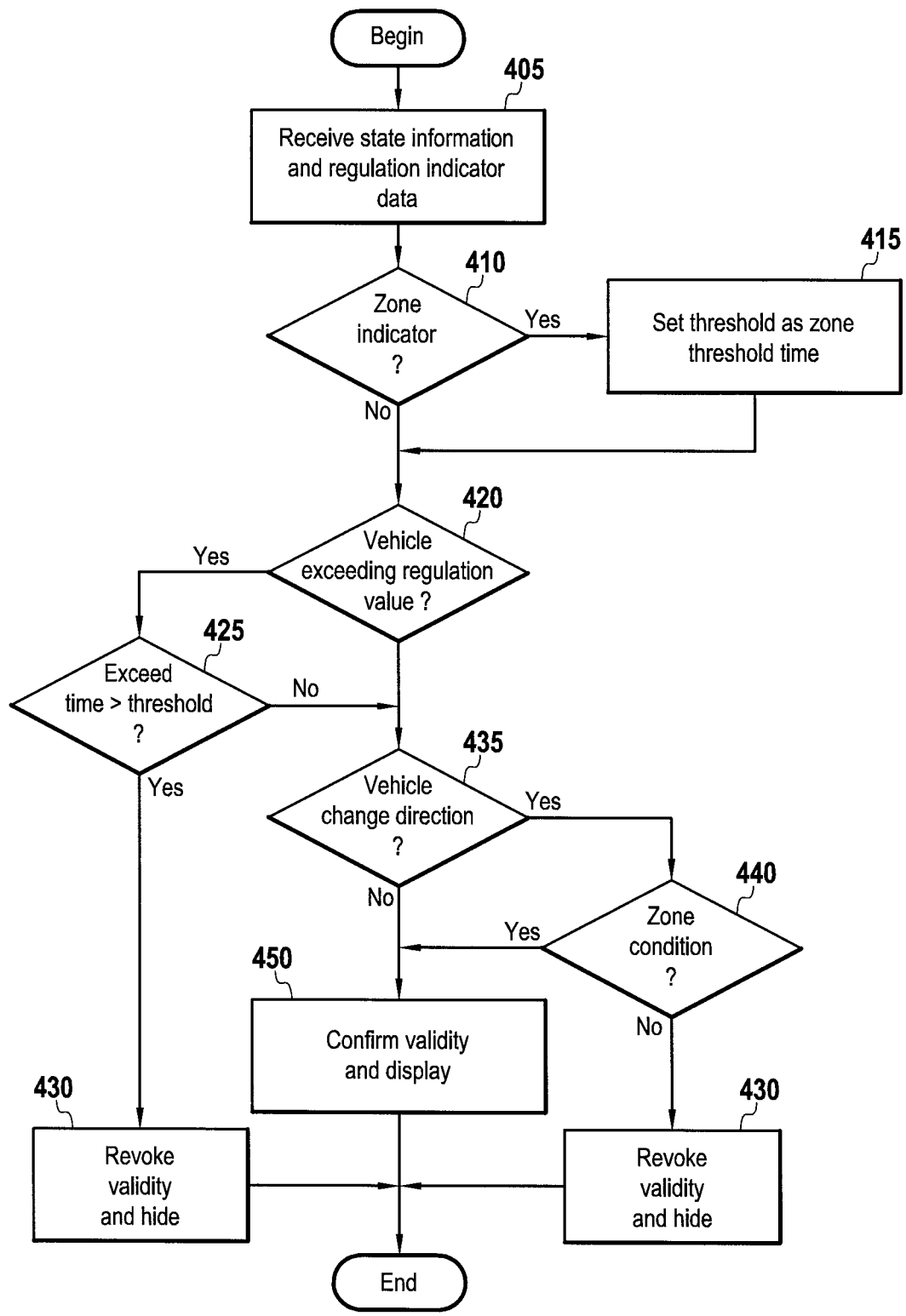
FIG. 4 is a flowchart highlighting an exemplary method for carrying out embodiments of the present disclosure.

FIG. 4 is a flowchart depicting an exemplary processing routine for confirming or revoking validity of a regulation indicator in exemplary scenarios depicted at FIG. 3, based on state information of the vehicle received from one or more sensors 20 and data provided by image obtaining means 15 related to one or more regulation indicators.

Importantly, not shown in flowchart 400 is the initialization of certain system variables with regard to the driver assistance system that may by undertaken by ECU 10 (e.g., upon starting a vehicle). For example, a threshold duration may be used by ECU 10 for various validation purposes, e.g., determining the validity of the speed limit sign 50. Such a threshold duration value may be stored in a database as referenced above. This threshold duration may be set initially, for example, to a predetermined amount, e.g. 10 seconds, 20 seconds, etc. Depending on certain conditions regarding vehicle state and data provided by image obtaining means 15, this predetermined threshold value may be changed, as will be discussed below in greater detail.

Image obtaining means 15 may obtain image data related to a regulation indicator for a road on which the vehicle 2 is currently traveling and send this information to ECU 10 (step 405). Also at step 405, one or more sensors 20 may obtain state information related to vehicle 2, for example a vehicle speed, a vehicle traveling direction, and a vehicle yaw rate, and provide this information to ECU 10. Upon receiving the state information and the regulation indicator data, ECU 10 may be configured to determine a validity of a regulation value associated with the regulation indicator.

According to some embodiments image obtaining means 15 may be configured to provide the regulation value associated with the regulation indicator to ECU 10. Alternatively ECU 10 may be configured to use the data provided by image obtaining means 15 to determine the regulation value. For example, where image obtaining means 15 obtains an image and a speed limit sign indicating a speed limit of 50 kilometers per hour, the data may be provided to ECU 10, and ECU 10 may subsequently determine that the regulation value equals a speed limit of 50 kilometers per hour, and may then cause an image of the regulation indicator indicating the 50 kilometer per hour speed limit on display 25.

In addition, image obtaining means 15 may be configured to provide data to ECU 10 indicating whether a zone condition exists. In other words when a vehicle enters a zone region where a zone condition exists, image obtaining means 15 may obtain data for example as shown by regulation indicator 55 of FIG. 3. Regulation indicator 55 of FIG. 3 indicates that only a regulation value (i.e. speed limit of 30 kilometers per hour) but also that a zone condition is in effect with regard to the speed limit of 30 kilometers per hour. When ECU 10 determines that a zone condition is in effect (step 410: yes) ECU 10 increases the threshold time to a zone condition threshold time (step 415). Zone condition threshold time may be greater arithmetically or geometrically as desired, than the initial predetermined threshold value. For example, where the initial predetermined threshold value is equal to 10 seconds, zone condition threshold time it may be equal to 20 seconds, 40 seconds, 100 seconds, or even greater, so as to enable desired validation of regulation indicator 50 within a zone 40.

If a zone condition is not in effect, or following determination of a zone condition, ECU 10 may determine whether vehicle 2 is exceeding the regulation value (e.g., speed limit) associated with the determined regulation value (step 420). For example where a regulation indicator provided a regulation value of 50 kilometers per hour, ECU 10 may use the state information provided by the one or more sensors 20 to determine a speed associated with vehicle 2. If the speed associated with vehicle 2 exceeds the regulation value (e.g. vehicle is travelling 70 kilometers per hour) (step 420: yes) ECU 10 may further use the state information to determine a duration over which the vehicle 2 has exceeded the regulation value. For example, ECU 10 may use the distance traveled by vehicle 2 during a determined period of time to determine the exceed duration. If the exceed duration exceeds the currently set threshold time, i.e. either the zone threshold time under a zone condition, or the initial predetermined threshold time, as the case may be (step 425: yes), validity of the regulation indicator will be revoked (step 430).

When ECU 10 determines that the vehicle has not been exceeding the regulation value (step 420: no) or that the vehicle has not exceeded the regulation value for greater than the threshold time) step 425: no) processor may then access additional state information from one or more sensors 22 to determine whether the vehicle has undergone a change in direction (step 435). For example, ECU 10 may analyze steering wheel position state information, and/or GPS data (where available), and/or information from image obtaining means 15 capable of indicating a change in direction vehicle 2.

When ECU 10 determines that the vehicle 2 has undergone a change in direction (step 435: yes), ECU 10 may once again check whether a zone condition is in effect. For example ECU 10 may simply check whether threshold time has been set as the zone threshold time, and if so ECU 10 recognizes the zone condition (step 440: yes). As noted above when a zone condition is in effect, a regulation value associated with that so is applicable throughout the entire zone and therefore a change in direction should not affect the validity of the regulation value. Therefore ECU 10 confirms validity and causes the regulation value to be displayed on display 25 (step 450). ECU 10 then continues the process of receiving state information and regulation data continuously awaiting a new regulation indicator.

If the processor determines that the zone condition is not in effect (step 440: no), then when the vehicle has changed direction as previously determined the regulation indicator is no longer valid and should be revoked. Therefore ECU 10 causes revocation of the regulation indicator (step 430), and removes display of the regulation indicator from display 25. ECU 10 then continues the process of receiving state information regulation data continuously awaiting a new regulation indicator.

One of skill in the art will recognize that additional variations may be provided without departing from the scope of the present disclosure. For example because an age of the data associated with a regulation indicator 50 may be tracked by ECU 10, as that age increases without identification by image identification means 15 of a new regulation indicator 50, validity of such an aging regulation indicator may be called in question. Therefore, ECU 10 may cause a modification in the display of the regulation value on display 25. For example, graying and/or general level of transparency may be modified by ECU 10 on display 25 to give a driver an indication of the age of the regulation value.

Of course the example above is exemplary only and not intended to be limiting.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method for driver assistance, comprising:
   obtaining one or more images of regulation indicators in proximity to a vehicle;
   determining:
   (i) whether a zone indicator is comprised among the one or more images, the zone indicator identifies an area within which a particular set of traffic rules applies throughout the area, and
   (ii) a regulation value based on the one or more images;
   receiving state information related to the vehicle;
   confirming a validity of the determined regulation value based on the state information, the determined regulation value, and when detected, the zone indicator; and
   displaying the regulation value when a validity of the regulation value is confirmed, and hiding the regulation value when the validity of the regulation value is revoked, wherein
   when the state information indicates a change of direction of the vehicle, the validity is revoked unless a zone indicator is comprised among the one or more images.

2. The method according to claim 1, comprising:
   modifying the display of the regulation value based on an age of the data.

3. The method according to claim 2, wherein the modifying is selected from at least one of a graying and an increasing a transparency of the displayed regulation value.

4. The method according to claim 1, wherein the regulation value is a speed limit.

5. The method according to claim 1, wherein the zone indicator is one of a beginning-of-zone indicator or an end-of-zone indicator.

6. A driver assistance system for a vehicle, comprising:
   a camera configured to obtain one or more images of regulation indicators and to determine a regulation value based on the one or more images;
   at least one sensor configured to provide state information related to a state of the vehicle;
   a processor configured to:
   determine:
   (i) whether a zone indicator is comprised among the one or more images, the zone indicator identifies an area within which a particular set of traffic rules applies throughout the area, and
   (ii) a regulation value based on the one or more images;
   confirm a validity of the determined regulation value; and
   cause the regulation value to be displayed when the validity is confirmed and prevent display of the regulation value when the validity is revoked,
   wherein when the state information indicates a change of direction of the vehicle, the processor is configured to revoke the validity unless a zone indicator is comprised among the one or more images.

7. The driver assistance system according to claim 6, wherein the state information comprises at least one of a vehicle speed, a distance travelled, and a change in vehicle travel direction.

8. The driver assistance system according to claim 6, wherein, the processor is configured to modify the display of the regulation value to reflect an age of the data.

9. The driver assistance system according to claim 8, wherein the modification is selected from at least one of graying and increasing a transparency of the displayed regulation value.

10. The driver assistance system according to claim 6, wherein the regulation value is a speed limit.

11. The driver assistance system according to claim 6, wherein the zone indicator is one of a beginning-of-zone indicator or an end-of-zone indicator.

12. A method for driver assistance, comprising:
    obtaining one or more images of regulation indicators in proximity to a vehicle;
    determining
    (i) whether a zone indicator is comprised among the one or more images,
    (ii) a regulation value based on the one or more images;
    receiving state information related to the vehicle;
    confirming a validity of the determined regulation value based on the state information, the determined regulation value, and when detected, the zone indicator; and
    displaying the regulation value when a validity of the regulation value is confirmed, and hiding the regulation value when the validity of the regulation value is revoked, wherein
    when the state information indicates a change of direction of the vehicle, the validity is revoked unless a zone indicator is comprised among the one or more images; and
    when the state information indicates that a duration during which a speed maintained by the vehicle exceeds the regulation value, is greater than a threshold value, the validity is revoked.

* * * * *